United States Patent [19]

Szulczewski

[11] Patent Number: 5,289,738

[45] Date of Patent: Mar. 1, 1994

[54] HYDROSTATIC TRANSAXLE ASSEMBLY AND IMPROVED COUPLING ARRANGEMENT THEREFOR

[75] Inventor: Dennis E. Szulczewski, Eden Prairie, Minn.

[73] Assignee: Eaton Corporation, Cleveland, Ohio

[21] Appl. No.: 980,136

[22] Filed: Nov. 23, 1992

Related U.S. Application Data

[63] Continuation of Ser. No. 895,536, Jun. 8, 1992, abandoned.

[51] Int. Cl.⁵ .............................................. F16H 57/02
[52] U.S. Cl. ........................................ 74/606 R; 475/83; 60/487
[58] Field of Search .............. 74/606 R; 180/62; 475/78, 83; 60/454, 487

[56] References Cited

U.S. PATENT DOCUMENTS

| | | | |
|---|---|---|---|
| 3,902,567 | 9/1975 | Pekar, Jr. | 74/606 R X |
| 4,726,256 | 2/1988 | von Kaler et al. | 74/665 N X |
| 4,756,208 | 7/1988 | Hayashi et al. | 475/83 X |
| 4,856,368 | 8/1989 | Fujisaki et al. | 74/606 R |
| 4,870,820 | 10/1989 | Nemoto | 60/487 |
| 4,891,943 | 1/1990 | Okada | 60/464 |
| 4,893,524 | 1/1990 | Ohashi et al. | 475/83 |
| 4,905,472 | 3/1990 | Okada | 60/487 X |
| 4,953,426 | 9/1990 | Johnson | 74/606 R |
| 4,979,583 | 12/1990 | Thoma et al. | 180/62 |
| 4,986,073 | 1/1991 | Okada | 60/954 |

Primary Examiner—Leslie A. Braun
Assistant Examiner—Khoi Ta
Attorney, Agent, or Firm—L. J. Kasper

[57] ABSTRACT

A hydrostatic transaxle is disclosed of the type including a hydrostatic transmission (11;221), a differential gear means (19;243), and first (21;213) and second (23;215) axle shafts. The hydrostatic transmission includes a transmission case (34;229,231) having a second case portion (31;231) including an output hub portion (97;235). The transaxle includes axle housing casing halves 133,135;209,211) joined together on a plane containing the axis of rotation of the axle shafts, and including an output portion (163,165;209,211) in tight engagement about the output hub portion. Another portion (173;229,231,249) of the transmission case cooperates with one of the axle casing halves to define a secondary mounting means and a torque reaction means which, together with the output hub portion, comprise the only portions of the transmission case operatively associated with the axle housing (131;208). The disclosed mounting or coupling of the hydrostatic transmission and the axle housing makes it possible to integrate the hydrostatic transmission and gear axle assembly, while at the same time segregating the hydraulic fluid of the hydrostatic transmission from the lubricant of the gear axle assembly, but still simplifying the overall structure of the assembly.

18 Claims, 8 Drawing Sheets

HYDROSTATIC TRANSAXLE ASSEMBLY AND IMPROVED COUPLING ARRANGEMENT THEREFOR

This application is a continuation of application Ser. No. 895,536, filed Jun. 8, 1992, now abandoned.

BACKGROUND OF THE DISCLOSURE

The present invention relates to hydrostatic transaxle assemblies, and more particularly, to such transaxle assemblies of the type including a hydrostatic transmission (HST) and an axle assembly including gearing, a differential, and a pair of axle shafts.

Hydrostatic transaxles of the type to which the Present invention relates have been used commercially on relatively small lawn and garden tractors. For a number of years, it has been known to combine a hydrostatic transmission, such as the Model M-7 HST sold commercially by Eaton Corporation, with a mechanical axle assembly, typically including speed reduction gearing, a differential gear set and a pair of axle shafts. Although such HST-gear axle assemblies have generally operated in a satisfactory manner, the overall configuration of the HST and gear axle assembly has generally not been considered optimum, especially for use on relatively smaller lawn and garden tractors.

More recently, some of those skilled in the art have attempted to combine the HST and the gearing and differential in a single assembly, thus improving the overall configuration (i.e., the size and shape relative to the rest of the tractor) An example of such a device is illustrated in U.S. Pat. No. 4,856,368, in which an axial piston pump and axial piston motor are disposed within a fairly complex assembly of housing portions. Although the device of the '368 patent could have improved the overall configuration of the transaxle, one disadvantage of the particular construction is that the hydraulic fluid utilized by the axial piston pump and motor would be in communication with the fluid or grease used to lubricate the gear train and differential. As is now well known to those skilled in the art, the level of contamination (i.e., small metal or dirt particles) must be kept much lower in a hydrostatic pump and motor than what is acceptable in a gear train or in differential gearing.

In U.S. Pat. No. 4,979,583, there was an attempt to overcome the problem of mixing of fluids by "encapsulating" a complete hydrostatic transmission between a pair of axle casing halves which parted on a horizontal plane containing the axis of rotation of the axle shafts. Furthermore, the stated intent in the '583 patent was to accomplish the encapsulation in a way which would segregate the hydrostatic transmission from the gearing, thus keeping contamination from the gearing out of the hydraulic circuit of the HST.

Although allegedly solving the contamination problem, the device of the '583 patent inherently involved fairly complex structure, in order to achieve the encapsulation of the hydrostatic transmission between the upper and lower axle casing halves. Another disadvantage of the '583 patent relates to periodic servicing of the device. As is well known to those skilled in the art, it is frequently necessary or desirable to service or repair either the hydrostatic transmission or the gearing only. In the device of the '583 patent, it would be necessary to completely disassemble the axle casing halves, in order to have access to the HST, for purposes of performing service or repair.

SUMMARY OF THE INVENTION

Accordingly, it is an object of the present invention to provide an improved hydrostatic transaxle assembly which achieves the benefits of the hydraulic fluid of the hydrostatic transmission being segregated from the lubricant of the gear axle assembly.

It is another object of the present invention to provide an improved transaxle assembly which achieves the above-stated object while, at the same time, the hydrostatic transmission and gear axle assembly are "integrated" at assembly in a manner which simplifies the structural complexity of the hydrostatic transmission, the gear axle portion, and the overall assembly.

It is a further object of the present invention to provide a hydrostatic transaxle design which achieves the above-stated objects while facilitating service of the hydrostatic transmission, without major disassembly of the gear axle portion.

The above and other objects of the present invention are accomplished by the provision of a hydrostatic transaxle of the type including a hydrostatic transmission having an input means, a hydrostatic pump driven by the input means, a hydrostatic motor, and an output means driven by the motor. An axle assembly has a differential gear means including an input gear and first and second output gears, first and second axle shafts driven by the first and second output gears, respectively, and an output gear train operable to transmit torque from the output means of the hydrostatic transmission to the input gear of the differential gear means. The axle assembly further has an axle housing assembly comprising an upper casing half and a lower casing half, the casing halves being joined together on a plane containing an axis of rotation of the axle shafts and being operable to journal the axle shafts therebetween.

The improved hydrostatic transaxle is characterized by the hydrostatic transmission further including a transmission case comprising a first case portion and a second case portion, the case portions being joined together on a plane oriented generally perpendicular to an axis of rotation defined by the output means of the hydrostatic transmission. The second case portion includes an output hub portion surrounding the output means, and the axle housing casing halves include an output portion in tight engagement about the output hub portion of the second case portion. Another portion of the transmission case cooperates with a portion of at least one of the axle casing halves to define a secondary mounting means and a torque reaction means. The output hub portion, the secondary mounting means and the torque reaction means comprise the only portions of the transmission case operably associated with the axle housing.

DESCRIPTION OF THE PREFERRED EMBODIMENTS

Figure 1:
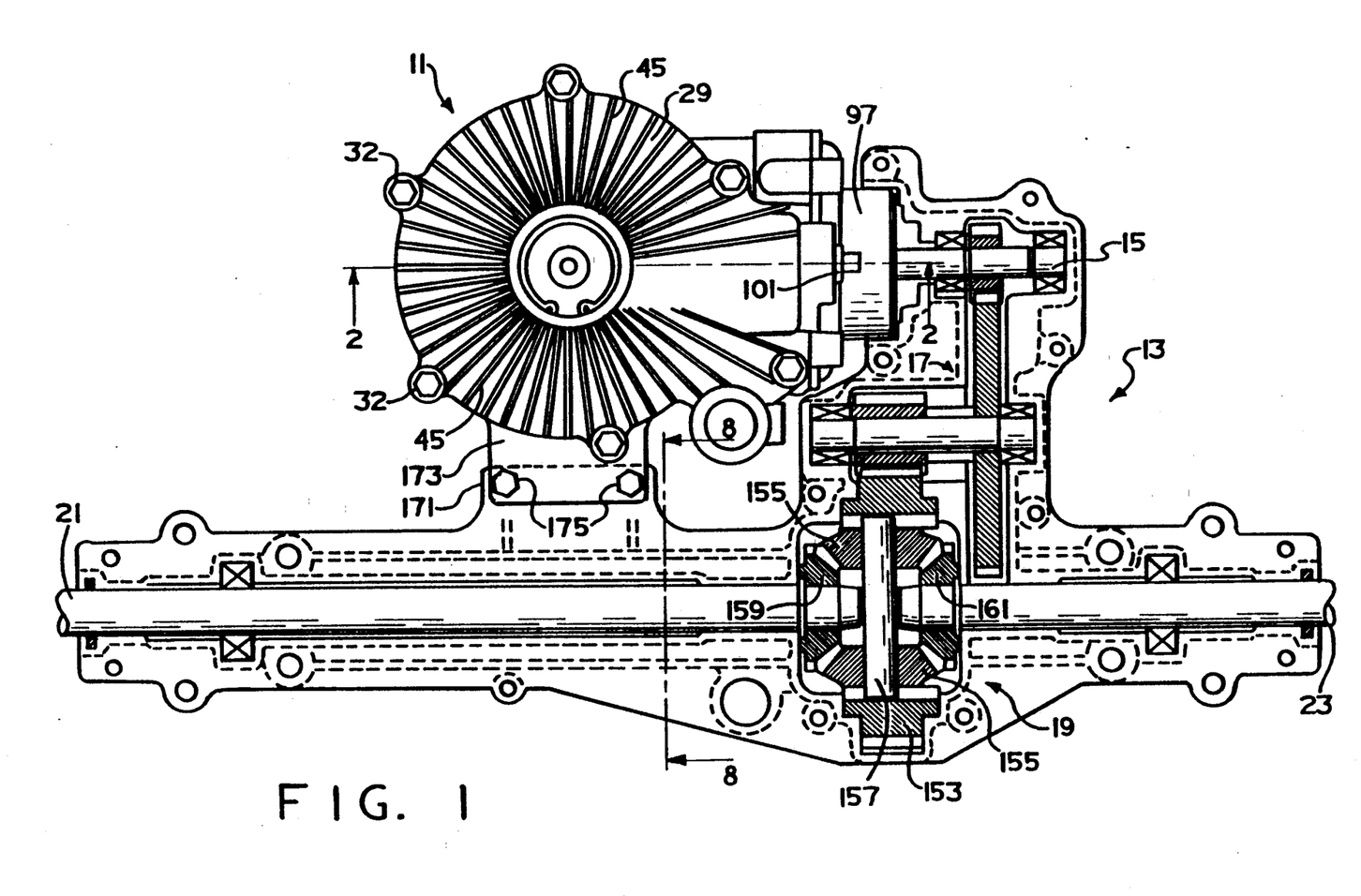
FIG. 1 is a view, partly in axial cross-section, and partly in plan view, of a hydrostatic transaxle made in accordance with the present invention.

Referring now to the drawings, which are not intended to limit the invention, FIG. 1 is a somewhat simplified view of a hydrostatic transaxle made in accordance with the present invention, and with the upper casing half removed. The transaxle includes a hydrostatic transmission (HST) portion, generally designated 11, and an axle assembly, generally designated 13. In a typical application, torque is transmitted from the vehicle engine (not shown) to the HST in a manner to be illustrated and described subsequently. The output torque of the HST is transmitted by means of an output shaft 15 to an output gear train, generally designated 17. The torque is next transmitted to a differential gear set, generally designated 19, which divides the torque between a left axle shaft 21 and a right axle shaft 23. The left and right axle shafts 21 and 23 transmit drive torque to a pair of vehicle drive wheels (not shown) in a manner well known to those skilled in the art, and which forms no part of the present invention.

Figure 2:
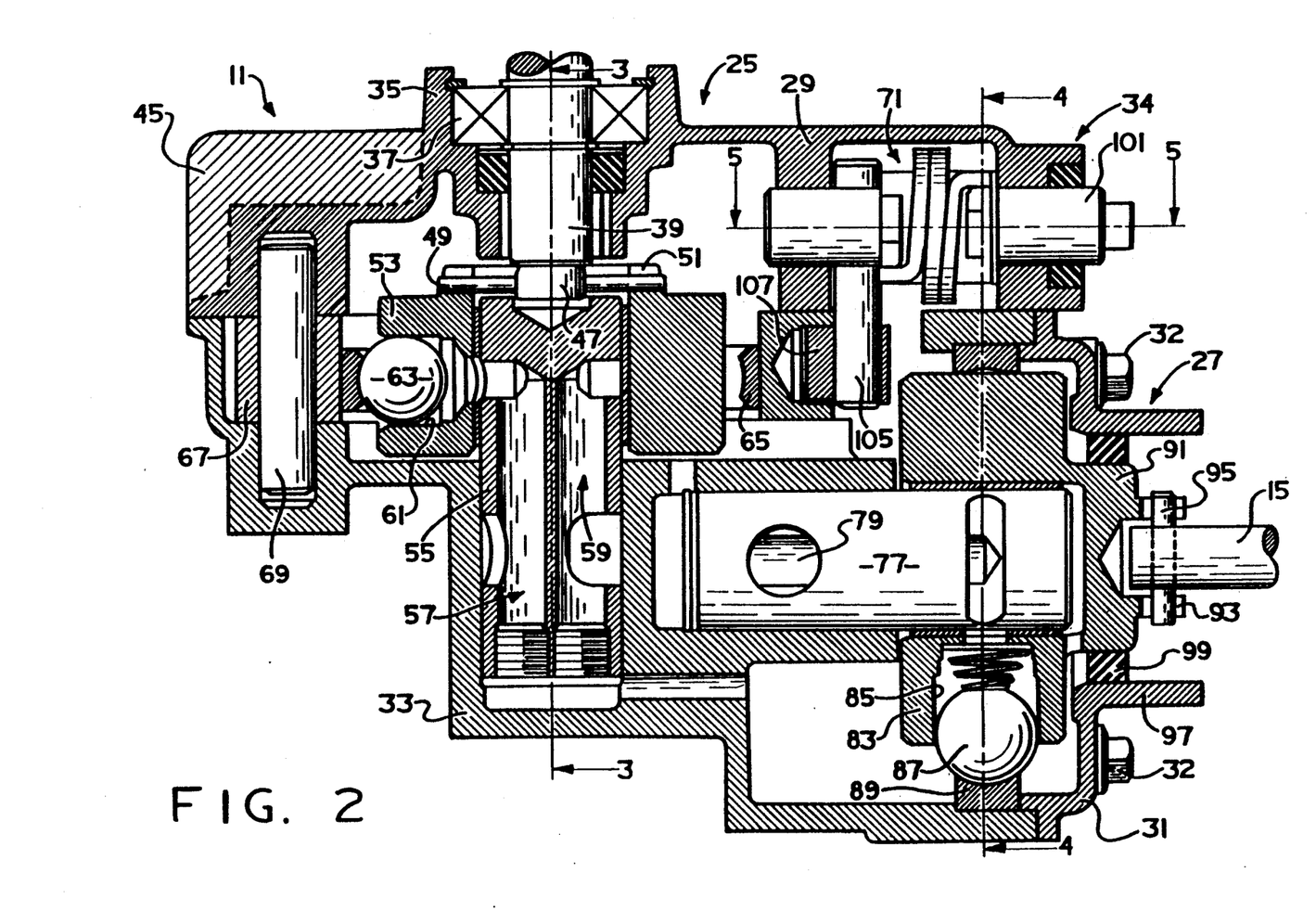
FIG. 2 is an enlarged, fragmentary transverse cross-section, taken on line 2—2 of FIG. 1, illustrating only the hydrostatic transmission portion of the transaxle of FIG. 1.

Referring now primarily to FIG. 2, the hydrostatic transmission 11 comprises, in a manner generally well known in the art, a hydrostatic pump, generally designated 25, and a hydrostatic motor, generally designated 27. The pump 25 includes a pump cover 29, while the motor 27 includes a motor cover 31, and the pump 25 and motor 27 share a common manifold body 33. The pump cover 29, motor cover 31, and manifold body 33 are joined together by a plurality of bolts 32 to form a hydrostatic transmission case, generally designated 34. Thus, the HST 11, as shown in FIG. 2, comprises a self-contained, stand-alone unit.

Figure 3:
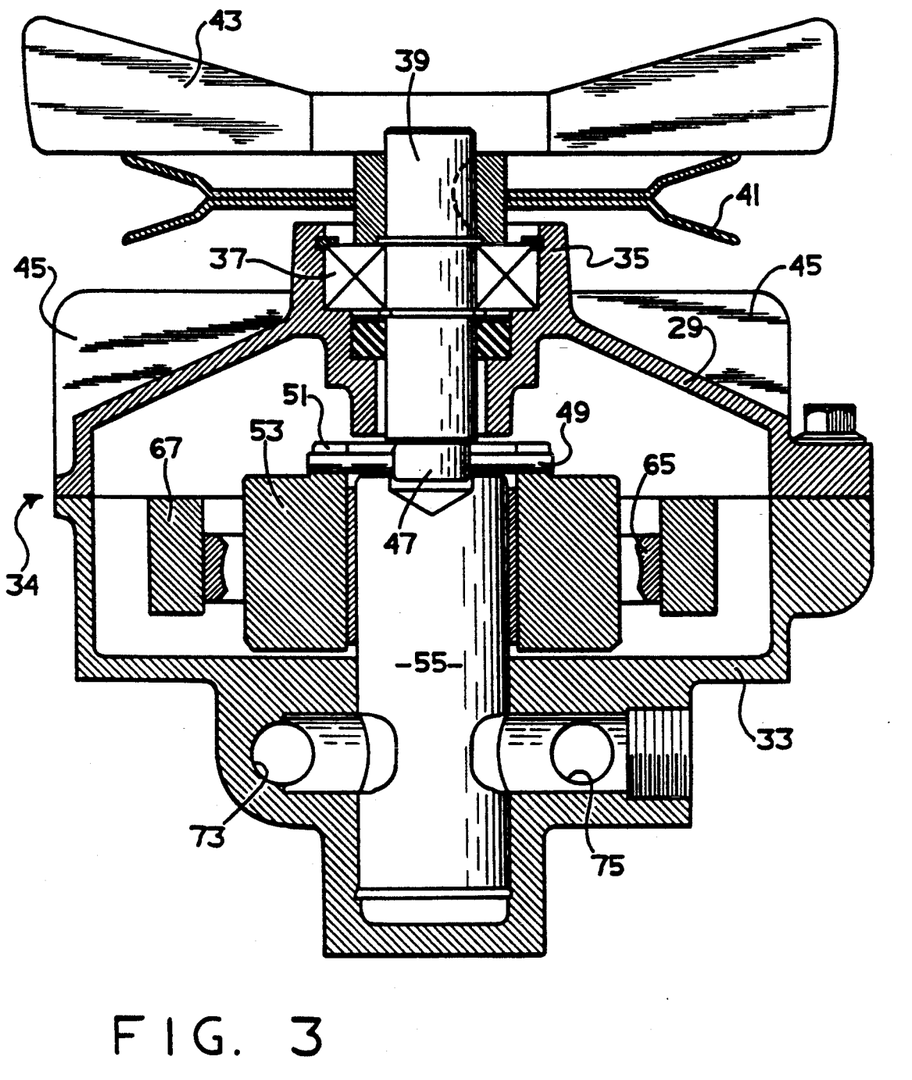
FIG. 3 is a transverse cross-section, taken on line 3—3 of FIG. 2, and on the same scale, but including an input pulley and cooling fan not shown in FIGS. 1 and 2.

Referring now to FIG. 3, in conjunction with FIG. 2, the pump cover 29 defines an input hub portion 35, within which is disposed a bearing set 37, and supported thereby is an input shaft 39. Keyed to the input shaft 39 is an input pulley 41, by means of which engine torque is transmitted (input) to the hydrostatic pump 25. Disposed on the upper end (in FIG. 3) of the input shaft 39 is a cooling fan 43, the purpose of which is to draw cooling air over a plurality of cooling fins 45 (see FIGS. 1 through 3) which are preferably formed integrally with the pump cover 29. In the simplified view of FIG. 3, the pulley 41 and fan 43 are illustrated as comprising separate elements, but the pulley and fan could be formed as a single, integral part.

At its inner end (bottom end in FIGS. 2 and 3), the input shaft 39 includes a terminal portion 47 through which a drive pin 49 extends, transverse to the axis of rotation of the pump 25 and input shaft 39. The drive pin 49 engages a cut-out portion 51 of a pump rotor 53, whereby rotation of the input shaft 39 drives the rotor 53. The pump rotor 53 is disposed about a cylindrical support member 55 which is press-fit into a cylindrical bore in the manifold body 33. The support member 55 defines a pair of axially-extending bores 57 and 59 (see FIG. 2), the bore 57 comprising a low pressure inlet passage, and the bore 59 comprising a high pressure outlet passage.

The pump rotor 53 defines a plurality of cylinder bores 61, and disposed within each bore 61 is a piston or ball 63, the balls 63 being in engagement with, and restrained in their radial travel by, a concave surface on a race member 65, which is disposed within a cam ring 67. If the cam ring 67 were moved over-center to reverse direction of operation of the pump 25, the bore 57 would be the high pressure outlet passage, and the bore 59 would be the low pressure inlet passage. The cam ring 67 is disposed to pivot about the axis of a cam pivot pin 69, the pin 69 being received within a pair of aligned bores defined by the pump cover 29 and the manifold body 33. As is generally well known to those skilled in the art, a small amount of pivotal movement of the cam ring 67, without going over-center, varies the displacement and output fluid flow of the pump 25, for any given input speed. Pivotal movement of the cam ring 67 about the axis of the pivot pin 69 is accomplished by means of a displacement control assembly, generally designated 71, which will be described subsequently.

As the input shaft 39 rotates, the pump rotor 53 rotates. Some of the balls 63 move radially outward in their respective cylinder bores 61, drawing inlet fluid from the bore 57. At the same time, certain of the balls 63 are being displaced radially inwardly, thus pumping pressurized fluid through their respective cylindrical bores 61 into the bore 59. Referring still to FIGS. 2 and 3, the manifold body 33 defines a pair of axially-extending bores 73 and 75 which are in communication with the bores 57 and 59, respectively. Thus, high pressure fluid is pumped through the bore 75 to the motor 27.

In the subject embodiment, the hydrostatic motor 27 is a fixed-displacement motor, but is otherwise of the same general construction as the pump 25. Thus, the motor 27 includes a cylindrical support member 77 which is press-fit into the manifold body 33. The support member 77 defines an axially-extending bore 79, which communicates low pressure, exhaust fluid from the motor 27 back through the bore 73 and bore 57 to the inlet side of the pump 25. The support member 77 also defines an axially-extending bore 81 (see FIG. 4) which communicates high pressure fluid from the bore 59 through the bore 75 to the motor 27.

Rotatably supported on the support member 77 is a motor rotor 83 which defines a plurality of cylinder bores 85, with a piston or ball 87 being disposed reciprocally within each of the bores 85. The balls 87 are restrained in their radial travel by a concave surface of a race member 89, the race member 89 being seated within a recess in the manifold body 33, and restrained axially therein by the motor cover 31.

The motor rotor 83 includes an output portion 91 which defines a cut-out portion 93, in which is disposed a drive pin 95. The drive pin 95 extends through the output shaft 15, whereby rotation of the rotor 83 is transmitted to the output shaft 15. Preferably, the cutout portion 93 is generally U-shaped, and extends to the end (right end in FIG. 2) of the output portion 91, so that the output shaft 15 and the drive pin 95 are able to move axially relative to the output portion 91 during assembly and disassembly. Of course, the drive connection between the portion 91 and the shaft 15 is not limited to the pin 95, but could be any other suitable arrangement.

The motor cover 31 includes an output hub portion 97, and disposed radially between the output portion 91 of the rotor and the hub portion 97 is a seal member 99. It is one important aspect of the present invention that hydraulic fluid utilized by the hydrostatic pump 25 and the hydrostatic motor 27 remains within the hydrostatic transmission case 34, comprising the pump cover 29, the motor cover 31, and the manifold body 33. However, it should be understood that the present invention is in no way limited to any particular configuration of transmission case 34, except as hereinafter recited in the appended claims.

Figure 4:
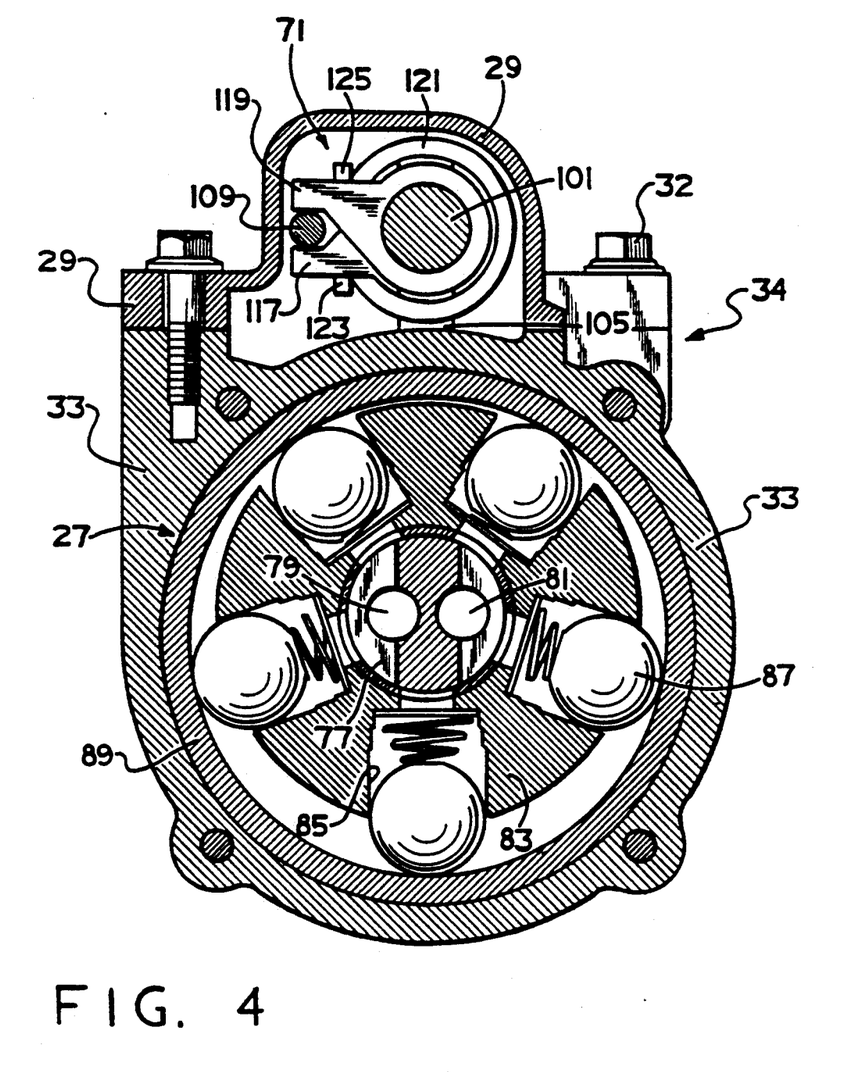
FIG. 4 is a transverse cross-section, taken on line 4—4 of FIG. 2, and on the same scale.
Figure 5:
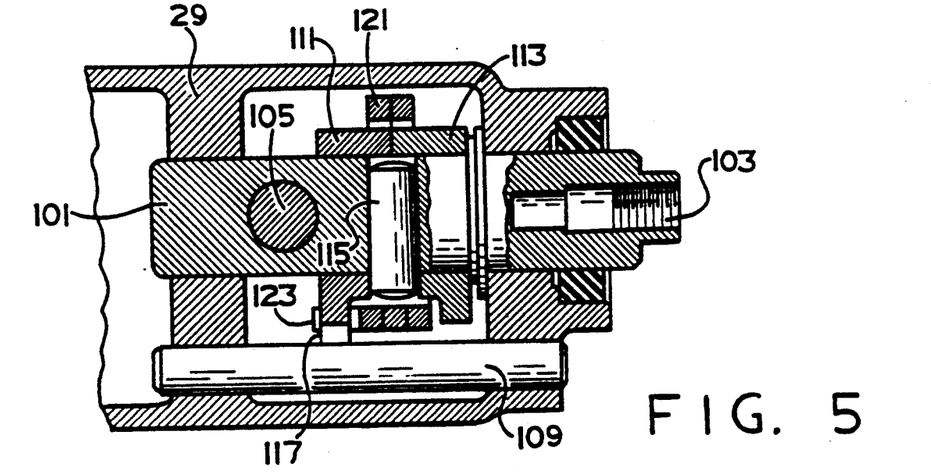
FIG. 5 is a further enlarged, fragmentary, axial cross-section taken on line 5—5 of FIG. 2.

Referring now primarily to FIGS. 2, 4, and 5, the displacement control assembly 71 will be described in greater detail. A control shaft 101 extends axially through a pair of cylindrical openings in the pump cover 29, and is supported for rotation therein. The control shaft 101 includes, at its outer end, a threaded opening 103, adapted for engagement with some sort of control linkage (not shown herein) of the type well known in the art. Appropriate movement of the linkage rotates the control shaft 101 about its axis of rotation, thereby causing angular displacement of a pin 105 which, as may be seen in FIG. 2, is received in an opening defined by a cylindrical connector 107, which is disposed within a cylindrical opening in the cam ring 67. Thus, rotation of control shaft 101 results in pivotal movement of the cam ring 67 about the axis of the pivot pin 69, in a known manner.

Referring now primarily to FIG. 5, an elongated pin 109 is disposed within a pair of openings in the pump cover 29 and is oriented generally parallel to the axis of rotation of the control shaft 101. Although not shown herein, it would typically be worthwhile to provide some sort of seal between the pin 109 and the adjacent surface of the pump cover 29. The function of the pin 109 will be described subsequently. Disposed about the control shaft 101 is a pair of identical actuator members 111 and 113, which are arranged in a mirror image of each other about an axis of a pin 115, which is press-fit into a transverse bore in the control shaft 101, such that one end of the pin 115 extends out of the control shaft as shown in FIG. 5.

The actuator member 111 includes a stop portion 117, which engages the underside of the pin 109 in FIG. 4, while the actuator member 113 includes a stop portion 119 which engages the top surface of the pin 109. Disposed about the actuator members 111 and 113 is a torsion spring 121 having one end 123 engaging the stop portion 117, and another end 125 engaging the stop portion 119. Rotation of the control shaft 101 in a counter-clockwise direction, as viewed in FIG. 4, will cause the pin 115 to rotate the actuator member 111 counter-clockwise, in opposition to the biasing force of the spring 121, thus varying the displacement of the pump 25 in one direction (e.g., forward). On the other hand, rotation of the control shaft 101 in the clockwise direction, as viewed in FIG. 4, will cause the pin 115 to move the actuator member 113 clockwise, in opposition to the biasing force of the spring 121, displacing the pump 25 in the opposite direction (e.g., reverse).

In either case, after actuation of the control linkage ceases, the biasing force of the spring 121 returns the control shaft 101 to the position shown in FIG. 4, with the stop portion (either 117 or 119) of whichever actuator member (111 or 113) had been displaced, again being in engagement with the pin 109, thus insuring centering of the displacement control assembly 71 and a neutral position of the cam ring 67, which also results in zero flow from the pump 25. The displacement control assembly 71, which forms no part of the present invention, is illustrated and described in greater detail, and in several different embodiments, in U.S. Pat. No. 5,234,321, issued Aug. 10, 1993, in the name of Sven B. Gafvert for a "VARIABLE DISPLACEMENT HYDROSTATIC PUMP AND NEUTRAL RETURN MECHANISM THEREFOR".

Figure 6:
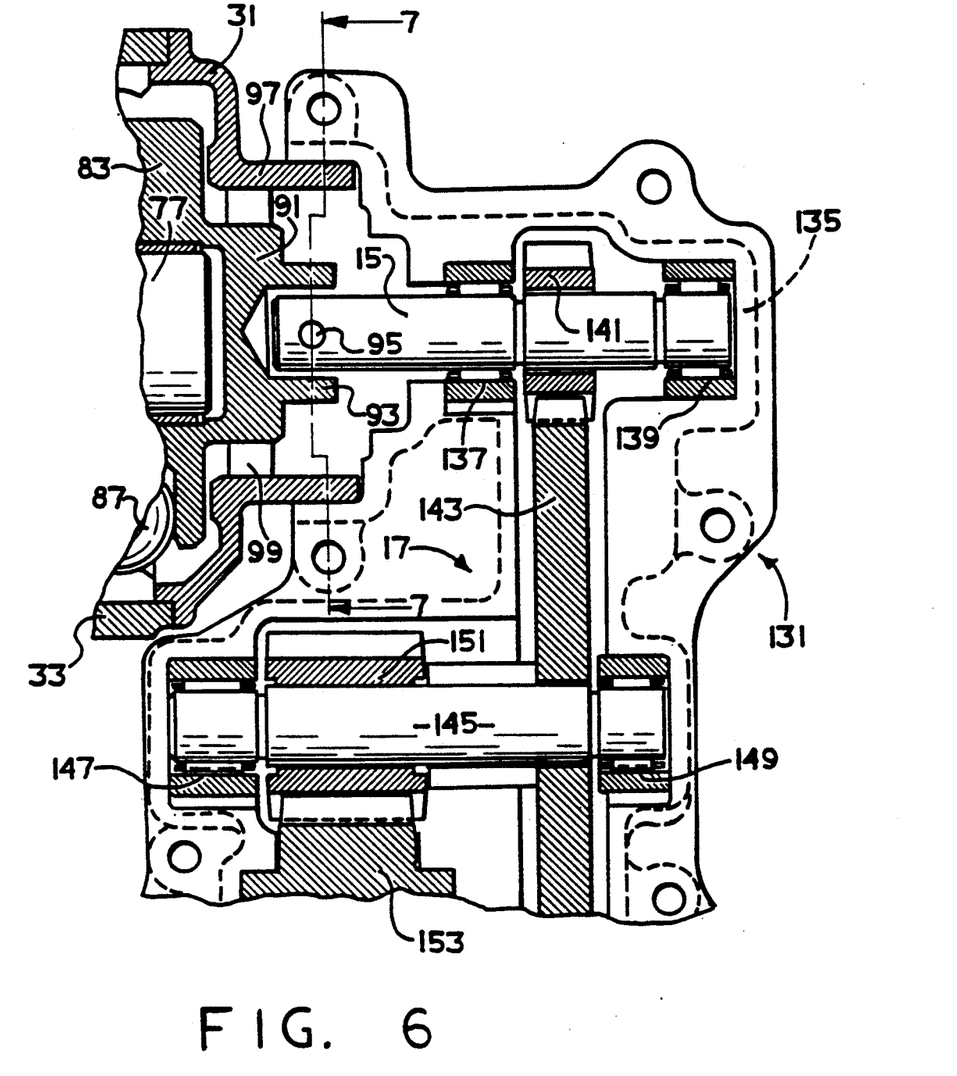
FIG. 6 is a fragmentary, axial cross-section, similar to FIG. 1, on a much larger scale than FIG. 1, and on the same scale as FIG. 2, illustrating the interface between the output portion of the hydrostatic transmission and the output gear train of the axle assembly.

Referring now primarily to FIG. 6, the axle assembly 13 includes an axle housing, generally designated 131, which includes an upper casing half 133 (shown only in FIGS. 7 and 8) and a lower casing half 135. The casing halves 133 and 135 are joined together on a plane which contains the axis of rotation of the left and right axle shafts 21 and 23, in a manner which is now generally well known to those skilled in the art. The recognized advantage of such an arrangement is the overall structural simplicity and ease of assembly which results when the axle shafts, and various other shafts, all have their axes located on the parting plane between the casing halves. It is one important aspect of the present invention to take maximum advantage of this type of axle housing construction by locating only the output gear train 17, the differential gear set 19, and the axle shafts 21 and 23 within the axle housing 131. In other words, there is no substantial structure within the axle housing 131 which is not symmetrical about an axis lying on the parting plane between the casing halves 133 and 135. The particular structure by which this is accomplished, and which differs from known prior art structures, will be described subsequently.

The output shaft 15 is rotatably supported within the axle housing by means of a pair of bearing sets 137 and 139. A gear 141 is fixed to rotate with the output shaft 15, and in toothed engagement with the gear 141 is a larger diameter gear 143. The gear 143 is fixed for rotation with an idler shaft 145, which has its opposite axial ends supported within the axle housing 131 by means of bearing sets 147 and 149. Also fixed for rotation with the idler shaft 145 is a gear 151, which is in toothed engagement with a gear 153 disposed about the differential gear set 19. The shaft 15 and the items 137 through 151, just described, constitute the output gear train 17. In the subject embodiment, the gear train 17 serves as a speed reduction gear set, by way of example only, providing a speed reduction (torque increase) from the output portion 91 of the hydrostatic motor 27 to the differential gear set 19 of approximately 17:1. It will be understood by those skilled in the art that the particular configuration of the output gear train 17 forms no part of the present invention, except for the fact that it is conventional to provide gearing to transmit torque from the hydrostatic motor 27 to the differential gear set 19.

Referring again primarily to FIG. 1, the differential gear set 19 may be fairly conventional, and includes a pair of input pinion gears 155 rotatably disposed on a pinion shaft 157. The pinion gears 155 are in toothed engagement with a pair of output side gears 159 and 161, which are rotatably fixed to the left and right axle shafts 21 and 23, respectively. Preferably, appropriate bearings and seals would be disposed between the upper and lower casing halves 133 and 135, supporting the axle shafts 21 and 23, and retaining lubrication fluid or grease within the axle housing 131. Thus, it may be seen from the foregoing description that every element disposed within the axle housing 131 rotates about an axis of rotation which lies on a parting plane defined by the upper and lower casing halves 133 and 135 (i.e., the plane of the drawing of FIG. 1). Even the pinion shaft 157 may be viewed as rotating about the axis of rotation defined by the axle shafts 21 and 23.

Conventionally, a hydrostatic transaxle, of the type to which the present invention relates, would include some sort of brake mechanism, operable by the vehicle operator. Such a brake mechanism comprises no part of the present invention, and is not illustrated or described in detail herein. However, as would be apparent to those skilled in the art, such a brake mechanism could be mounted external to the axle housing 131, and retard rotation of the output shaft 15, or a suitable brake mechanism could be disposed within the axle housing 131 to retard rotation of the shaft 15 or one of the other members of the output gear train 17. Alternatively, if it is desirable, on a particular vehicle, to have both braking and steer-by-brake capability, individual axle (or wheel) brakes could be provided in association with the axle shafts 21 and 23. In such an arrangement, the axle (or wheel) brakes could be applied simultaneously, to achieve braking, or could be applied individually, resulting in "steering", i.e., pivoting about the wheel which has been braked.

Figure 7:
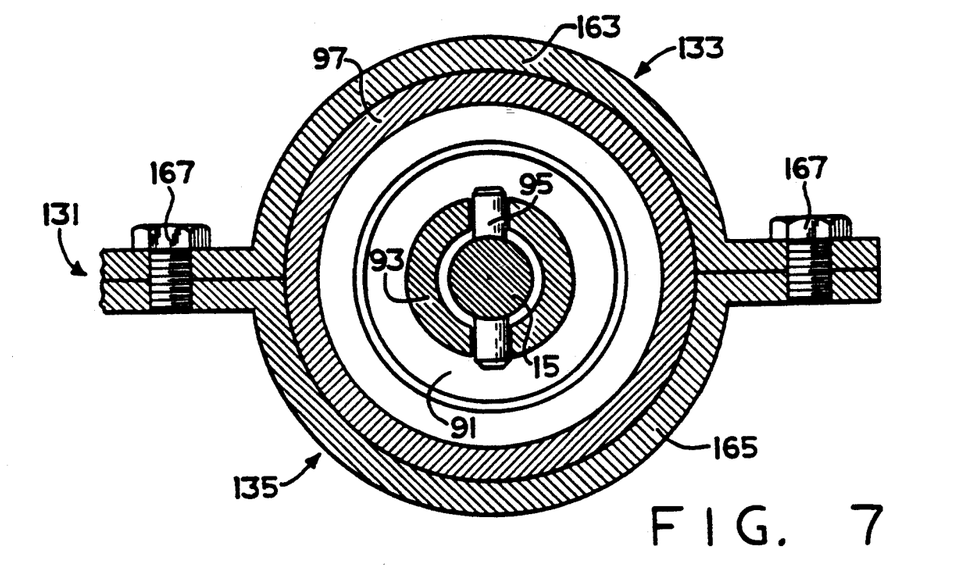
FIG. 7 is a transverse cross-section, taken on line 7—7 of FIG. 6, and on a larger scale than FIG. 6.

It is one important aspect of the present invention that the primary interface between the hydrostatic transmission 11 and the axle assembly 13 structure is of the type illustrated in FIG. 7. The output hub portion 97 is the only portion of the hydrostatic transmission 11 involved in this particular interface which, unlike other various prior art structures, does not involve any sort of complex, expensive structure, such as a pair of mating flanges bolted together. Instead, the upper and lower casing halves 133 and 135 are clamped tightly about the output hub portion 97. More specifically, the upper casing half 133 includes a half-circular output portion 163, and similarly, the lower casing half 135 defines a half-circular output portion 165. As the upper and lower casing halves 133 and 135 are assembled by means of a plurality of bolts 167, the hydrostatic transmission 11 is positioned as shown in FIG. 6, with the cylindrical output hub portion 97 disposed within the cylinder defined by the output portions 163 and 165. As the bolts 167 are tightened, the result is a rigid mounting of the axle assembly 13 to the hydrostatic transmission 11, which requires no assembly steps beyond those required to assemble the casing halves 133 and 135 anyway. By way of example only, and not by way of limitation, the output hub portion 97 may have a taper, i.e., its O.D. decreases slightly toward its right end in FIG. 6. Similarly, the inside diameter defined by the output portions 163 and 165 may be provided with a corresponding taper. It is anticipated that the O.D. of the output hub portion 97 would be equal to, or greater than, the I.D. defined by the output portions 163 and 165, whereby tightening of the bolts 167 would result in a tight clamping of the portions 163 and 165 about the hub portion 97. It is believed to be within the ability of those skilled in the art to select the appropriate dimensions and tolerance ranges for the I.D. and O.D. involved.

Figure 8:
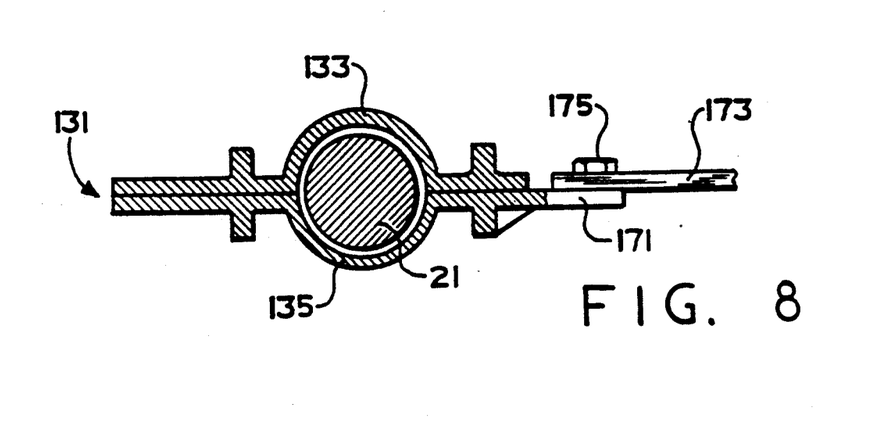
FIG. 8 is a transverse cross-section, taken on line 8—8 of FIG. 1, and on a larger scale than FIG. 1.

Referring now primarily to FIG. 8, as a secondary mounting arrangement, the upper and lower casing halves 133 and 135 cooperate to define a housing extension 171 which, in the subject embodiment, is part of the lower casing half 135 and extends toward the hydrostatic transmission 11. Preferably integral with the manifold body 33 of the HST 11 is a flange portion 173, which is bolted to the housing extension 171 by means of a pair of bolts or capscrews 175. The result is a secondary interface or mounting so that the interface shown in FIG. 7 does not sustain the entire load being transmitted by the transaxle. In addition, the engagement of the extension 171 and flange 173 on a plane parallel to the axis of rotation of the output shaft 15 results in this secondary interface also serving as a "torque reaction means". In other words, the torque being transmitted through the transaxle causes a torque on the hydrostatic transmission 11 tending to rotate it about the axis of the output shaft 15. However, the connection between the extension 171 and the flange 173 takes up any such reaction torque acting on the HST 11. Those skilled in the art will appreciate that there could be another similar arrangement elsewhere on the transaxle, in which case, one could be considered the secondary mounting arrangement, and the other could be considered the torque reaction means even though each such arrangement performs both functions.

In assembling the transaxle of the present invention, the lower casing half 135 would be placed in a fixture, with the shaft 15, the output gear train 17, the differential gear set 19, and the axle shafts 21 and 23 being assembled, as shown in FIG. 1, within the lower casing half 135. Next, the hydrostatic transmission 11 would be put into its proper location, as shown in FIGS. 1 and 6, with the drive pin 95 being slid into the cut-out portion 93. The upper casing half 133 would then be put into its proper location, and the bolts 175 at least partially tightened. Finally, the bolts 167 would be tightened, drawing the upper and lower casing halves 133 and 135 tightly together and clamping the portions 163 and 165 about the output hub portion 97, in the manner described previously.

It is one important benefit of the present invention that the hydrostatic transmission 11 may be removed from the axle assembly 13, such as for purposes of periodic service or maintenance, without the necessity of disassembling the axle assembly. This may be accomplished simply by removing the bolts 175, and then merely loosening the two bolts 167 which are shown in FIG. 7, sufficiently to be able to slide the output hub portion 97 out of the output portions 163 and 165. This may be done without loosening any of the rest of the bolts 167 which are holding the upper and lower casing halves 133 and 135 together. During such disassembly, the output shaft 15 remains within the axle assembly 13, and the drive pin 95 becomes disengaged from the cut-out portion 93. After completion of servicing the hydrostatic transmission 11, it may then be reassembled to the axle assembly 13, simply by reversing the disassembly steps. The gear lubricant or grease disposed within the axle assembly 13 is not lost, nor are any of the parts contained therein disturbed in any way during such disassembly and service of the hydrostatic transmission 11. In addition, there is no mixture of hydraulic fluid with the fluid or grease within the axle assembly 13.

Similarly, the reduction gearing and the differential can be repaired or serviced merely by removing the upper casing half 133, without disturbing the hydrostatic transmission.

Alternative Embodiment

Figure 9:
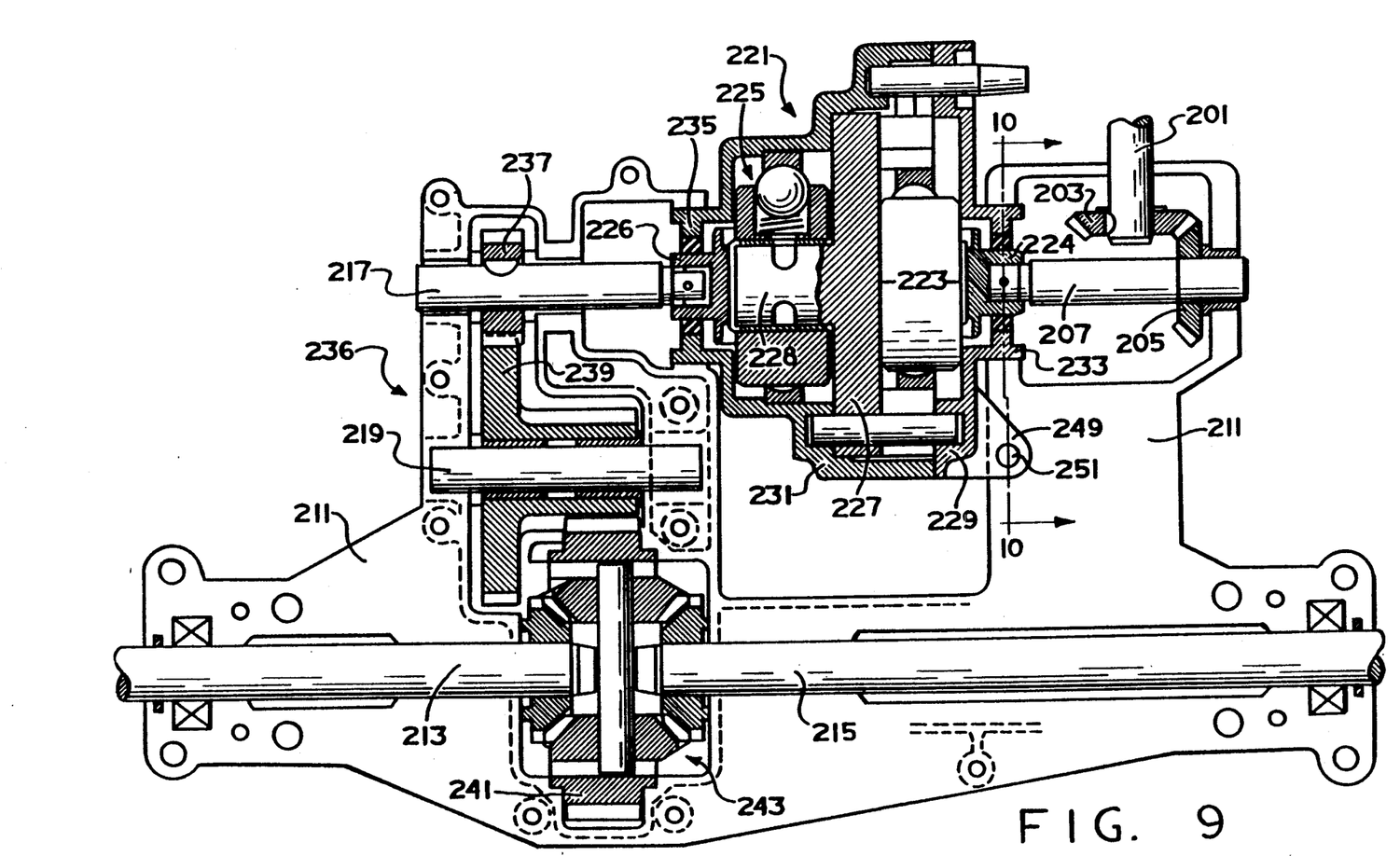
FIG. 9 is a view, similar to FIG. 1, and mostly in axial cross-section, illustrating an alternative embodiment of the present invention.

Referring now primarily to FIG. 9, there is illustrated an alternative embodiment of the present invention, which differs from the primary embodiment in several ways. Given the typical requirement for a vertical input to the transaxle, and the fact that the axle shafts are obviously in a horizontal plane, it is necessary to "turn the corner" somewhere within the transaxle. In the primary embodiment, this is done within the hydrostatic transmission 11 by means of the support members 55 and 77 being disposed at right angles, and having interconnecting passages in the manifold body 33. By way of contrast, in the embodiment of FIG. 9, there is a vertical input shaft 201 which appears in FIG. 9 to be oriented horizontally (in the plane of the drawing) but in reality, is intended to be vertical (see FIG. 10). The shaft 201 is keyed to a bevel gear 203, which is in toothed engagement with a bevel gear 205. The bevel gears 203 and 205 perform the function of "turning the corner" in a fairly simple manner, resulting in certain advantages to be described subsequently.

The gear 205 is disposed on an input shaft 207 which is journalled, at its right end in FIG. 9, by an axle housing, generally designated 208 (see FIG. 10), comprising upper and lower casing halves 209 (shown only in FIG. 10) and 211. The casing halves are joined together on a plane which contains the axis of rotation of the input shaft 207, left and right axle shafts 213 and 215, an output shaft 217, and an idler shaft 219. It should be understood that the joining of the upper and lower casing halves 209 and 211 is generally the same in the alternative embodiment as in the primary embodiment. The primary difference in the axle casing in the alternative embodiment is that it includes a portion surrounding the bevel gears 203 and 205, on the input side of the device.

The input shaft 207 extends into a hydrostatic transmission, generally designated 221, which is more similar in construction to the Model 7 transmission sold commercially by the assignee of the present invention than is the HST 11 in the primary embodiment. The transmission 221 includes a pump 223, and a motor 225, each of which is constructed in generally the same manner as in the primary embodiment. Thus, the pump 223 includes an input portion 224 and the motor 225 includes an output portion 226, the portions 224 and 226 being configured generally the same as the output portion 91 in the primary embodiment. However, in the alternative embodiment, because it is not necessary to "turn the corner" within the hydrostatic transmission 221, both the rotor of the pump 223 and the rotor of the motor 225 may be mounted on a common pintle assembly, generally designated 227, which typically includes a large annular central plate with a support member 228 extending axially through the plate (or perhaps being integral therewith). The support member 228 may be quite similar to either of the support members 55 or 77 in the primary embodiment.

The hydrostatic transmission 221 includes a pump cover 229 and a motor cover 231, the covers 229 and 231 being joined on a transverse plane, oriented generally perpendicular to the axis of rotation defined by the input shaft 207 and the output shaft 217, the covers preferably being joined by a plurality of bolts (not shown in FIG. 9). The pump cover 229 includes an input hub portion 233, while the motor cover 231 includes an output hub portion 235, the function of the hub portions to be described subsequently.

The output torque of the HST 221 is transmitted to an axle assembly 236, which corresponds generally to the axle assembly 13 of the primary embodiment. The output shaft 217 is part of an output gear train, substantially the same in overall arrangement as the output gear train 17 of the primary embodiment. Thus, the output shaft 217 is keyed to a gear 237, which is in engagement with a larger diameter gear 239, fixed to rotate with the idler shaft 219. The gear 239 includes a set of teeth in engagement with a gear 241, surrounding a differential gear set, generally designated 243, which drives the axle shafts 213 and 215 in the same manner as does the differential gear set 19 in the primary embodiment.

Figure 10:
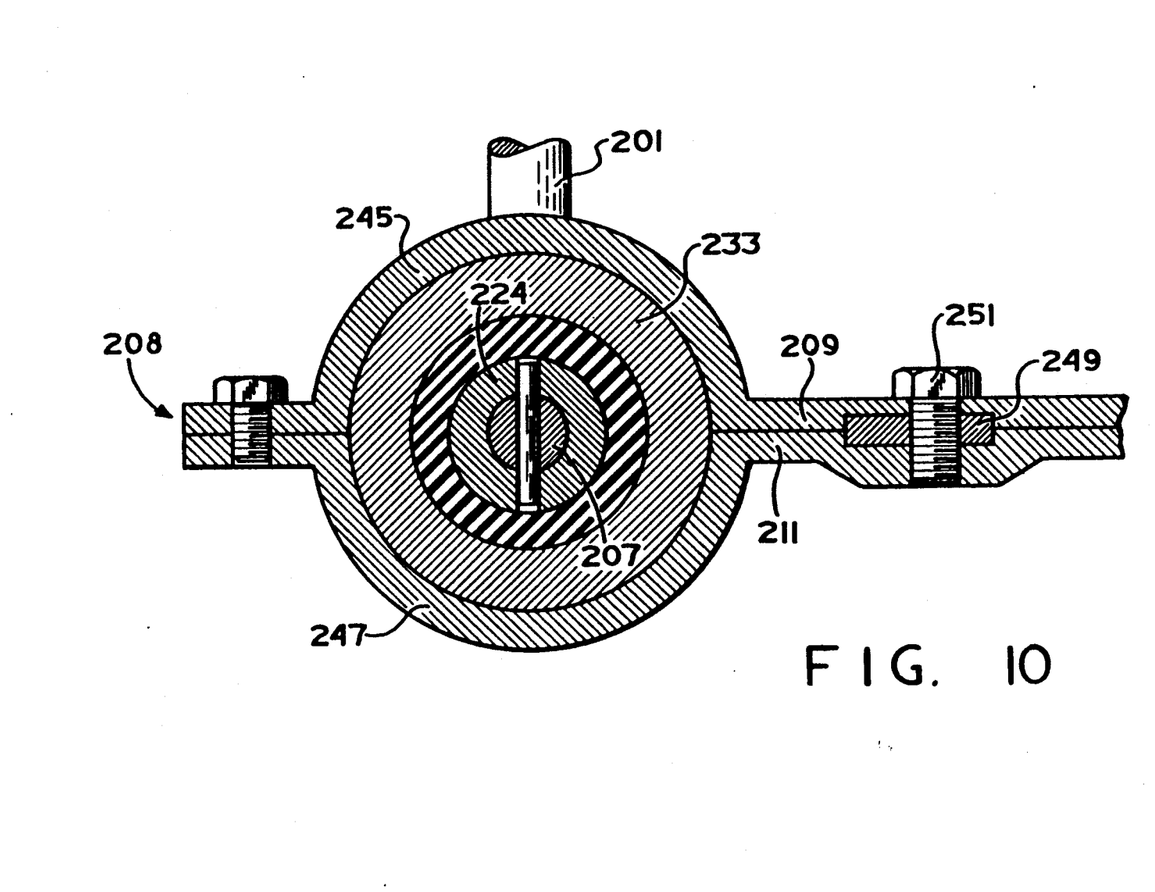
FIG. 10 is a transverse cross-section, taken on line 10—10 of FIG. 9, and on a larger scale than FIG. 9.

Referring now primarily to FIG. 10, the upper casing half 209 defines a half-circular input portion 245, and the lower casing half 211 defines a half-circular input portion 247, the portions 245 and 247 surrounding the input hub portion 233 of the HST 221 in generally the same manner as was shown in FIG. 7, regarding the primary embodiment. It should be noted that what is shown in FIG. 10 is also representative of the arrangement which is on the output side of the hydrostatic transmission 221, i.e., where the casing halves 209 and 211 surround the output hub portion 235.

Referring now to both FIGS. 9 and 10, the pump cover 229 includes a torque reaction tab 249 which preferably is trapped between the upper and lower casing halves 209 and 211, in a recess which may be defined by the casing halves together (as shown in FIG. 10), or may be defined by either one of the casing halves alone. In either case, it is intended that the torque reaction tab 249 be trapped or restrained in a manner which reacts against the tendency for the hydrostatic transmission 221 to rotate about the axis of the shafts 207 and 217. Preferably, there may be one of a plurality of bolts 251, which are used to join the upper and lower casing halves 209 and 211, passing through the tab 249, to insure an especially tight fit between the casing halves 209 and 211 at the point where they trap the torque reaction tab 249.

Thus, it may be seen that the alternative embodiment of FIGS. 9 and 10 makes it possible to use a simpler, more compact, and less expensive hydrostatic transmission 221 than was the case in the primary embodiment. However, there is then the need for the input bevel gearing, and the axle casing halves become somewhat more complex. On the other hand, the upper and lower casing halves surround and clamp the HST housing at both axial ends thereof, thus presumably providing an even more rigid interface or coupling than in the primary embodiment.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

I claim:

1. A hydrostatic transaxle of the type including a hydrostatic transmission having an input means, a hydrostatic pump driven by said input means, a hydrostatic motor, and an output means driven by said motor;

and an axle assembly having a differential gear means including an input gear and first and second output gears, first and second axle shafts driven by said first and second output gears, respectively, and an output gear train operable to transmit torque from said output means of said hydrostatic transmission to said input gear of said differential gear means, said axle assembly further having an axle housing comprising an upper casing half and a lower casing half, said casing halves being joined together on a first plane containing an axis of rotation of said first and second axle shafts and being operable to journal said axle shafts therebetween; characterized by:

(a) said hydrostatic transmission further including a transmission case comprising a first case portion and a second case portion, said case portions being joined together on a second plane oriented generally perpendicular to an axis of rotation defined by said output means;

(b) said second case portion including an output hub portion surrounding said output means;

(c) said axle housing casing halves including an input portion in cooperative engagement about said output hub portion of said second case portion;

(d) another portion of said transmission case cooperating with a portion of at least one of said axle casing halves to define a secondary mounting means and a torque reaction means; and (e) said output hub portion, said secondary mounting means, and said torque reaction means comprising the only portions of said transmission case fixedly secured with said axle housing.

2. A hydrostatic transaxle as claimed in claim 1, characterized by output seal means disposed between said output means and said output hub portion, said output seal means being operable to retain hydraulic fluid within said transmission case.

3. A hydrostatic transaxle as claimed in claim 1, characterized by said transmission case including said torque reaction means being formed integrally therewith and oriented generally parallel to said axis of rotation of said first and second axle shafts, said torque reaction means being disposed parallel to one of said axle housing upper and lower casing halves to prevent rotation of said hydrostatic transmission case, relative to said axle housing.

4. A hydrostatic transaxle as claimed in claim 1, characterized by an output gear train being disposed within said axle housing, and in operable engagement with said output means of said hydrostatic transmission, said output gear train including at least one gear shaft in operable engagement with said output means, and oriented generally parallel to said axis of rotation of said first and second axle shafts, said axle housing upper and lower casing halves being operable to journal said gear shaft.

5. A hydrostatic transaxle as claimed in claim 1, characterized by substantially every element disposed within said axle housing having an axis and being symmetrical about said axis, said axis lying on said second plane containing said axes of rotation of said first and second axle shafts.

6. A hydrostatic transaxle as claimed in claim 1, characterized by said output hub portion defining a taper, whereby the outside diameter of said output hub portion decreases in a direction extending away from said hydrostatic motor, said input portion of said axle housing halves defining a corresponding taper.

7. A hydrostatic transaxle of the type including a hydrostatic transmission comprising a fluid pump including input means and a fluid motor including output means; an axle assembly having a differential gear means operable to transmit drive torque to first and second axle shafts; an output gear train operable to transmit torque from said output means of said fluid motor to said differential gear means; said axle assembly further having an axle housing comprising an upper casing half and a lower casing half, said casing halves being joined together on a plane containing an axis of rotation of said first and second axle shafts and being operable to journal said axle shafts therebetween; characterized by:

(a) said input means of said fluid pump and said output means of said fluid motor defining a common axis of rotation;

(b) said hydrostatic transmission further including a transmission case comprising a first case portion and a second case portion, said case portions being joined together on a plane oriented generally perpendicular to said common axis of rotation;

(c) said first case portion including an input hub portion and said second case portion including an output hub portion, said hub portions being disposed at opposite axial ends of said hydrostatic transmission;

(d) said axle housing casing halves including an input portion in cooperative engagement about said input hub portion, and an output portion in cooperative engagement about said output hub portion.

8. A hydrostatic transaxle as claimed in claim 7, characterized by said transmission case including a portion operably associated with at least one of said axle casing halves to provide a torque reaction means, operable to resist rotational torque acting on said hydrostatic transmission, about said common axis of rotation.

9. A hydrostatic transaxle as claimed in claim 8, characterized by said input hub portion, said output hub portion, and said torque reaction portion comprising the only portions of said transmission case fixedly secured with said axle housing.

10. A hydrostatic transaxle as claimed in claim 7, characterized by substantially every element disposed within said axle housing being symmetrical about an axis lying on said plane containing said axes of rotation of said first and second axle shafts.

11. A hydrostatic transaxle as claimed in claim 7, characterized by said input hub portion and said output hub portion each defining a taper, whereby the outside diameters of said hub portions decreases in a direction extending axially away from said fluid pump and said fluid motor, respectively; said input portion and said output portion defined by said axle housing casing halves defining corresponding tapers.

12. A hydrostatic transaxle of the type including a hydrostatic transmission having an input means, a hydrostatic pump driven by said input means, a hydrostatic motor, and an output means driven by said motor; and an axle assembly having a differential gear means including an input gear and first and second output gears, first and second axle shafts driven by said first and second output gears, respectively, and an output gear train operable to transmit torque from said output means of said hydrostatic transmission to said input gear of said differential gear means, said axle assembly further having an axle housing comprising an upper casing half and a lower casing half, said casing halves being joined together on a plane containing an axis of rotation of said first and second axle shafts and being operable to journal said axle shafts therebetween; characterized by:

(a) said hydrostatic transmission further including a transmission case comprising a first case portion and a second case portion, said case portions being joined together on a plane oriented generally perpendicular to an axis of rotation defined by said output means;

(b) said axle housing casing halves including a receiving portion disposed to surround said output means of said hydrostatic transmission;

(c) another portion of said transmission case cooperating with at least one portion of said axle casing halves to define mounting means and a torque reaction means; and (d) said output means, said mounting means and said torque reaction means comprising the only portions of said transmission case fixedly secured to said axle housing.

13. A hydrostatic transaxle as claimed in claim 12, characterized by said output means comprising the only location of said hydrostatic transmission surrounded by said axle housing casing halves.

14. A hydrostatic transaxle as claimed in claim 12, characterized by said second case portion including an output hub portion surrounding said output means and defining a generally cylindrical pilot surface piloted within said receiving portion of said axle housing casing halves.

15. A hydrostatic transaxle of the type including a hydrostatic transmission having an input means, a hydrostatic pump driven by said input means, a hydrostatic motor, and an output means driven by said motor; and an axle assembly having a differential gear means including an input gear and first and second output gears, first and second axle shafts driven by said first and second output gears, respectively, and an output gear train operable to transmit torque from said output means of said hydrostatic transmission to said input gear of said differential gear means, said axle assembly further having an axle housing comprising an upper casing half and a lower casing half, said casing halves being joined together on a plane containing an axis of rotation of said first and second axle shafts and being operable to journal said axle shafts therebetween; characterized by:

(a) said hydrostatic transmission further including a transmission case comprising a first case portion and a second case portion, said case portions being joined together to define a main transmission case, and output hub portion, and at least one mounting portion extending radially outwardly from said main transmission case portion;

(b) said axle housing casing halves including a receiving portion disposed to surround said output means of said hydrostatic transmission, and a mounting means in fixed engagement with said mounting portion of said transmission case; and (c) said surrounding relationship of said receiving portion and said output means, and said engagement of said mounting means and said mounting portion comprising substantially the only engagement of said transmission case and said axle housing.

16. A hydrostatic transaxle as claimed in claim 15, characterized by said main transmission case portion being disposed out of contact with said axle housing.

17. A hydrostatic transaxle as claimed in claim 15, characterized by said output hub portion surrounding said output means and defining a generally cylindrical pilot surface piloted within said receiving portion of said axle housing casing halves.

18. A hydrostatic transaxle as claimed in claim 15, characterized by said receiving portion defined by said axle housing casing halves being disposed in cooperative engagement with said output hub portion defined by said first and second transmission case portions.

* * * * *